March 8, 1927.

G. F. EGAN

VEHICLE FENDER

Original Filed July 3, 1923   9 Sheets-Sheet 1

1,620,196

INVENTOR
George F. Egan
BY
J. R. Bowen
ATTORNEY

March 8, 1927.

G. F. EGAN

VEHICLE FENDER

Original Filed July 3, 1923  9 Sheets-Sheet 2

1,620,196

INVENTOR
George F. Egan
BY
J. R. Bowen
ATTORNEY

March 8, 1927.

G. F. EGAN

1,620,196

VEHICLE FENDER

Original Filed July 3, 1923   9 Sheets-Sheet 5

INVENTOR
George F. Egan
BY
J.R. Bowen
ATTORNEY

March 8, 1927. 1,620,196
G. F. EGAN
VEHICLE FENDER
Original Filed July 3, 1923   9 Sheets-Sheet 8

INVENTOR
George F. Egan
BY J. R. Bowen
ATTORNEY

March 8, 1927. 1,620,196
G. F. EGAN
VEHICLE FENDER
Original Filed July 3, 1923  9 Sheets-Sheet 9

Fig. 18.

INVENTOR
George F. Egan
BY

Patented Mar. 8, 1927.

1,620,196

UNITED STATES PATENT OFFICE.

GEORGE F. EGAN, OF JERSEY CITY, NEW JERSEY.

VEHICLE FENDER.

Application filed July 3, 1923, Serial No. 649,321. Renewed December 11, 1925.

The present invention relates to fenders for vehicles, and has more particular reference to a fender of the basket type.

An object of the invention is to provide a vehicle fender which is automatic in action that is, which is held normally a distance above the ground to clear the usual obstructions, but which when brought into contact with the person or object, is depressed backwardly and released so as to fall downwardly to a predetermined extent.

A further object of the invention is to provide a fender with improved means whereby it may be quickly and readily brought back to normal condition after being tripped, and which embodies a novel hook releasing mechanism which when tripped releases a retaining hook and permits the basket to fall and which when the basket is brought back to normal position automatically places the hook in operative position to support the basket or fender.

The invention also aims at the provision of means associated with an automatic fender for automatically indicating at the rear of the vehicle to which the fender is applied, the striking and dropping of the fender to thus give warning to the occupants of following vehicles that the first car has struck a person or object and will make an emergency stop.

With the foregoing and other objects in view, the invention will be more fully described hereinafter, and will be more particularly pointed out in the claims appended hereto.

In the drawings, wherein like symbols refer to like or corresponding parts throughout the several views.

Referring to the drawings, and first to the form illustrated in Figures 1 to 7, 25 indicates a vehicle or other moving object, shown in the present instance as a conventional type of motor vehicle having a front axle 26 carrying the usual front wheels 27. The axle 26 is shown as carrying a forwardly extending bracket plate 28 which may be secured by bolts or the like to the forward side of the axle, such as by clips 29. The bracket plate 28 is shown as extending across the front of the axle for a considerable extent and as inclined forwardly and downwardly at a suitable angle and as having a longitudinal slot 30 formed therein.

The body of the fender is shown as comprising a basket 31 of suitable mesh construction and having uprights 32 at its rear end and forwardly and downwardly inclined side rails 33. The uprights 32 are shown as positioned some little distance from the vehicle and these uprights 32 are shown as bent away from the vehicle, the object being to prevent a person thrown into the basket from striking against the vehicle. The side rails 33 are shown as connected at their forward ends to a bumper bar 34 and also to the bottom of the basket 31. The basket is shown as resting upon a pair of strap irons 35 arranged beneath the opposite end portions of the basket and provided at their rear ends with hooks 36 adapted to catch in the slotted portion 30 of the bracket plate and hinged thereupon to support the basket 31 in its swinging movements.

Shown as arranged beneath the intermediate portion of the basket 31 and lengthwise of the vehicle 25, is a center bar 37 provided with a hinge knuckle 38 at a point spaced rearwardly of the standards 32 and which is shown as having at its rear end slidable engagement in a guide or strap 39 mounted upon the axle 26 for holding the bar 37 in place. The rear end of the bar 37 is shown as provided with an upturned arm 40 adapted to move with the bar toward and from a fixed contact 41 mounted on the vehicle 25, the arm 40 and the contact 41 being shown as connected respectively to line wires 42 and 43 of an electric circuit which includes a signal lamp 44 and a battery 45 or suitable exciter for producing flow of current when the circuit is closed. The lamp 44 is in the nature of a danger signal and is preferably arranged upon the rear end of the vehicle so as to give suitable warning to occupants of following vehicles that the circuit is closed and that an emergency stop is about to be made.

Figure 1:
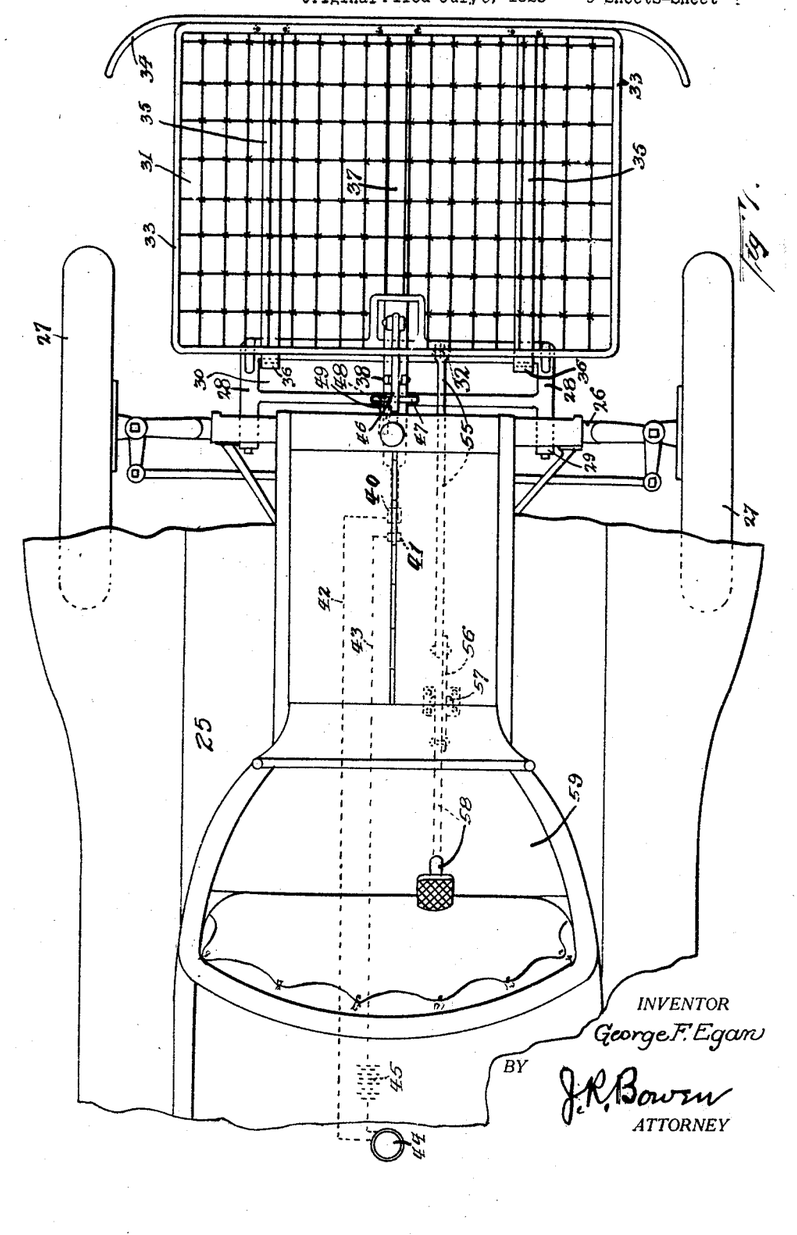
Figure 1 is a top plan view showing, fragmentarily the forward end of a vehicle having a fender embodying the present invention applied thereto.
Figures 2, 4, 5, 6, 8:
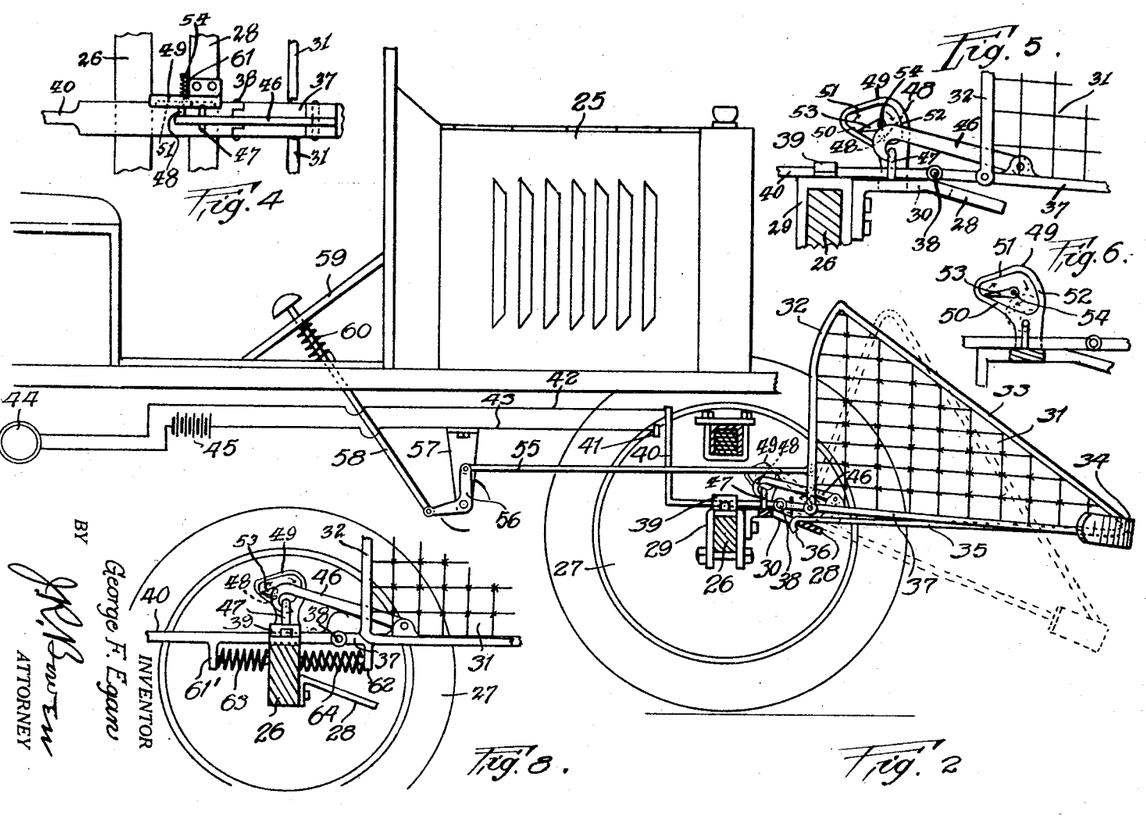
Figure 2 is a side elevation of the same, parts being shown in section and the fender being shown in full lines in normal raised position, and the dotted lines showing the position of the fender after it has been tripped.
Figure 4 is a fragmentary plan view of the mechanism of Figure 3 showing the parts returned to normal position.
Figure 5 is a fragmentary side elevation of the same.
Figure 6 is a fragmentary sectional view through the cam trackway and its parts which constitute the hook releasing and positioning means.
Figure 8 is a fragmentary side elevation of the forward end of a vehicle having a slightly modified form of the fender applied thereto, the modification illustrating an arrangement of opposing springs.
Figure 3:
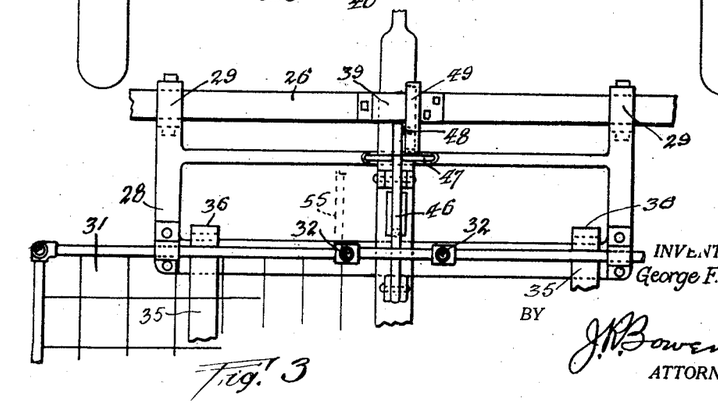
Figure 3 is an enlarged fragmentary plan view of the fender bracket with the adjacent portion of the basket and supporting and tripping mechanism with the parts tripped.

The arm 40 is shown as comprising a portion of the angle shaped inner part of the bar 37, and the hinge 38 of the bar is preferably normally located near the top of the bracket 28 so that when the basket 31 is released it is permitted to swing downwardly upon the hinge 38 into the position shown in dotted lines in Figure 2 and to rest upon the forwardly and downwardly extending portion of the bracket 28. The basket 31 is shown as normally supported in a substantially horizontal position as shown in full lines in Figure 2 by a hook or dog 46 which is hinged at one end to the bar 37 in front of the pivot 38 and which at its free end is adapted to engage in a loop 47 shown as mounted on the upper side of the bracket 28, at the top thereof. The horizontal portion of the arm 40 is shown as passing through the loop 47 and the latter is shown as of sufficient height to receive the bill of the hook 46 therein above the arm 40. The hook 46 is of such length that it engages the loop 47 when the basket 31 is raised and is adapted to maintain the basket in such position.

Means is provided for automatically releasing the hook 46 from the loop 47 when the bumper bar 34 is brought into contact with an object. For this purpose the free end of the hook 46 is shown as provided with a laterally extending pin 48 which projects into one side of a flanged casting 49 providing an internal cam. As shown to advantage in Figures 5 and 6, the cam 49 has a rearwardly and upwardly inclined ledge 50 which is rounded off into a forwardly and upwardly inclined surface 51, and the latter is shown as joined at its forward end to the forward lower end of the ledge 50 by an abruptly and downwardly extending guide portion 52, providing an internal cam of substantially triangular form the hypotenuse of which normally receives the pin 48 thereon. In order to insure that the pin 48 travels in one direction within the cam 49, a gate or switch 53 is shown as pivoted at 54 within the cam and as having a tapering free end projecting rearwardly toward the upper end of the ledge 50. When the pin 48 of the hook is moved rearwardly it traverses the ledge 50, lifts the switch 53 and continues in its upward rear movement until it clears the switch to permit the latter to drop back into normal position upon the ledge. Forward movement of the pin 48 causes the same to ride over the upper face of the switch 53 and into the forward end of the cam where it is free to drop back onto the lower portion of the ledge 50. The bill of the hook 46 is shown as of such curvature and dimension as to engage the loop 47 only when the pin 48 of the hook is on the ledge 50. The switch 53 is shown as having its upper surface so spaced above the loop 47 as to hold the bill of the hook free of the loop 47 until the hook moves forwardly a distance sufficient to clear the loop. This cam 49 is preferably mounted upon the upper end of the bracket 28 at one side of the bar or rod 37 so as to be closely adjacent to the hook 46. For the purpose of raising the basket 31 into normal position, the basket is provided with a rod 55 connected to the basket at a point above the bottom thereof and which extends rearwardly to the bell crank lever 56 pivoted in a bracket 57 depending from the vehicle frame 25. The bell crank lever 56 preferably has one arm extending vertically upward for connection with the rod 55 and its other end extending rearwardly for connection with a push rod 58 which may project upwardly through the toe board 59 of the vehicle for depression by the foot. A spring 60 may be employed for normally urging the push rod 58 upwardly and thus holding the parts under proper tension.

From Figure 4 it will be noted that the switch 53 may have a spring 61 upon the pivote 54 thereon, the spring 61 being arranged upon the remote side of the cam and adapted to normally urge the free end of the switch downwardly against the ledge 50. This insures the quick closing of the switch when the parts are operated quickly.

The operation of this embodiment of the invention is as follows:—

When an object strikes the bumper bar 34 it moves the basket 31 with its bar 37 backwardly sufficient to disengage the hook 46 from the loop 47. During this movement the pin 48 of the hook rides upwardly along the ledge 50 and passes to the upper side of the switch 53. At this time the arm 40 engages the contact 41 and the signal lamp 44 is lighted. As soon as the pin 48 reaches the upper side of the switch 53 the hook 46 is wholly disengaged from the loop 47 and the basket 31 is free to swing downwardly on its pivot 38 as far as the bracket 28 will permit. The object thus encountered is now tilted or thrown into the basket 31 instead of the vehicle passing over the object.

As soon as it is desired to return the basket to normal position, the operator presses upon the push rod 58 and swings the bell crank lever 56 to draw the rod 55 and swing the basket 31 back into normal raised position. During this movement the pin 48 moves upwardly upon the ledge 50 a distance sufficient to engage the hook over the loop 47, and when the push rod 58 is released the hook is free to remain in contact with the loop 47. There of course is sufficient space between the bill of the hook and the loop 47 to permit the hook to interlock with the loop without moving the pin 48 past the end of the switch.

The modification disclosed in Figure 8 is similar to the form above disclosed with the exception that the horizontal portion of the contact arm 40 is shown as provided with a depending projection or lug 61' adapted to be disposed rearwardly of the axle 26 and the bar 37 is provided with a similar projection 62 adapted to be located in front of the axle 26. Springs 63 and 64 are shown as disposed respectively between the projections 61' and 62 and the opposite sides of the axle 26 and the forward spring 64 serves to relieve the force of the blow occasioned by the bumper bar 34 striking an object and said spring 64 will also aid in raising the fender to normal position after the load is removed from the basket.

Figures 7, 9:
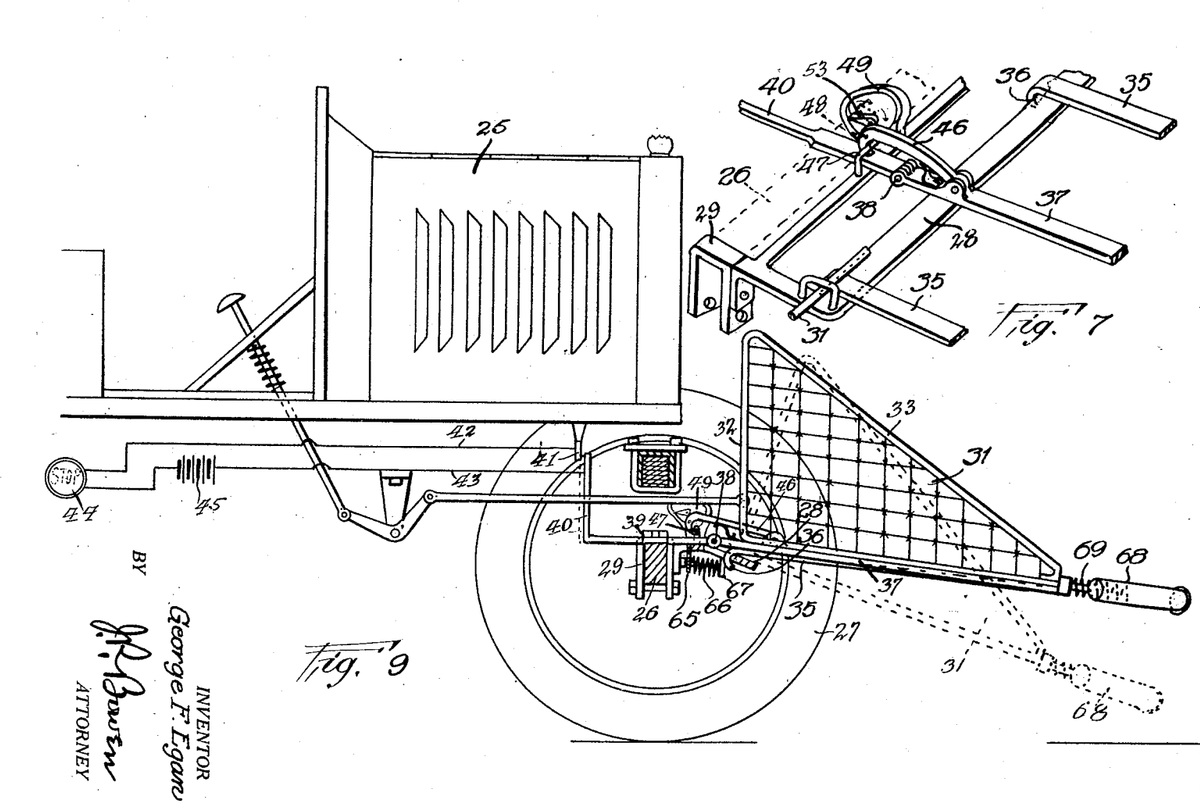
Figure 7 is a perspective fragmentary view of the bracket and its parts including the cam member in normal position.
Figure 9 is a side elevation of the forward end of a vehicle having another modified form of my fender applied thereto wherein the spring is interposed between the bracket and the fender.

In the modification disclosed in Figure 9 the bracket 28 is shown as provided with a depending lug 65 against which the rear end of a spring 66 bears, the forward end of the spring 66 engaging a second lug 67 carried upon the rear end of the adjacent bar 35. The spring 66 therefore tensions the basket 31 in its raised position by holding the hook 36 yieldingly against the inner edge of the forward portion of the bracket. As in the above described modification, the hooks 36 serve to limit the upward swinging movement of the basket 31, while in the present form the spring 66 serves to yieldingly urge the basket forwardly. The bumper bar 68 is shown in Figure 9 as provided with spring 69 for urging the latter forwardly from the basket. These springs 69 yield somewhat when the bar 68 strikes an object and thereby lessen the force of the blow.

Figure 10:
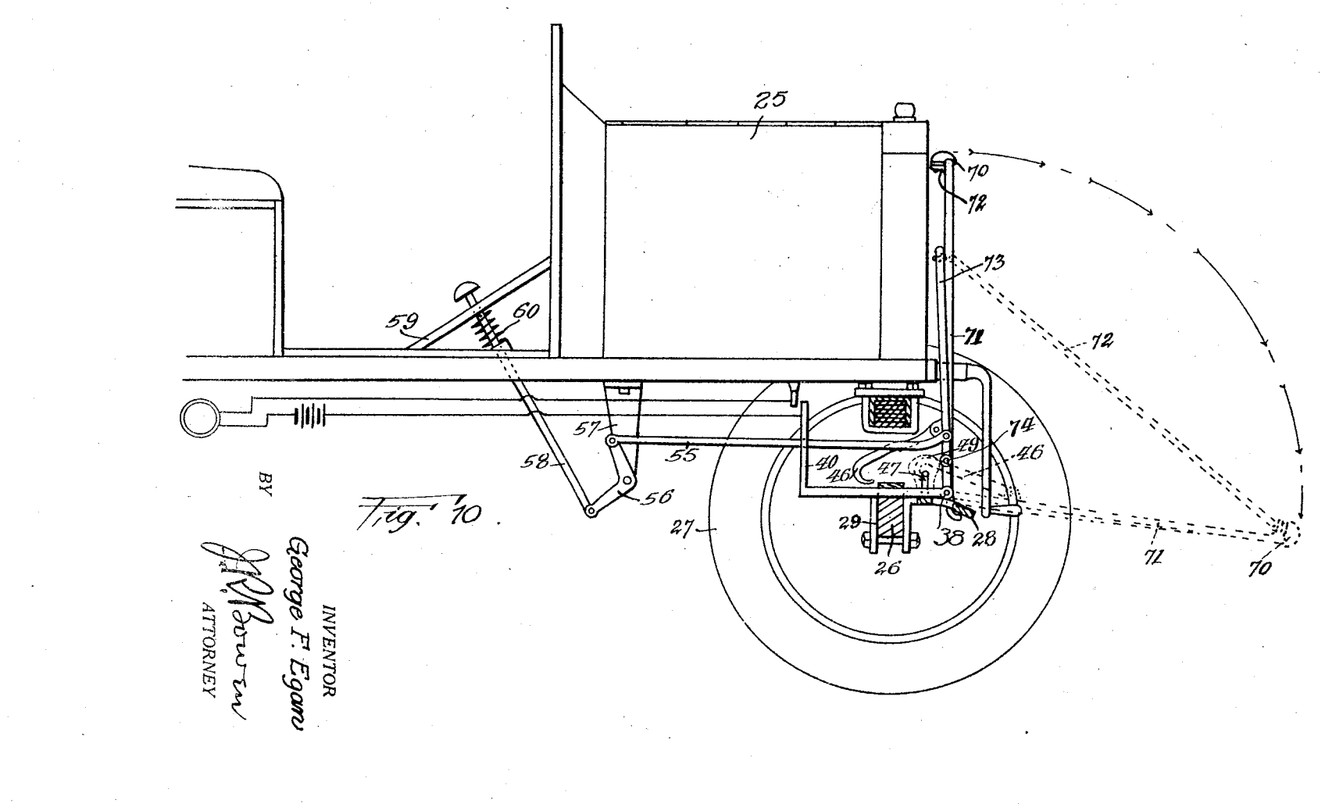
Figure 10 is a side elevation, partly in section of a motor vehicle having a further modified form of my fender applied thereto, and wherein the basket is collapsible upwardly as shown in full lines, the dotted lines showing the fender in normal extended position.
Figures 11, 12:
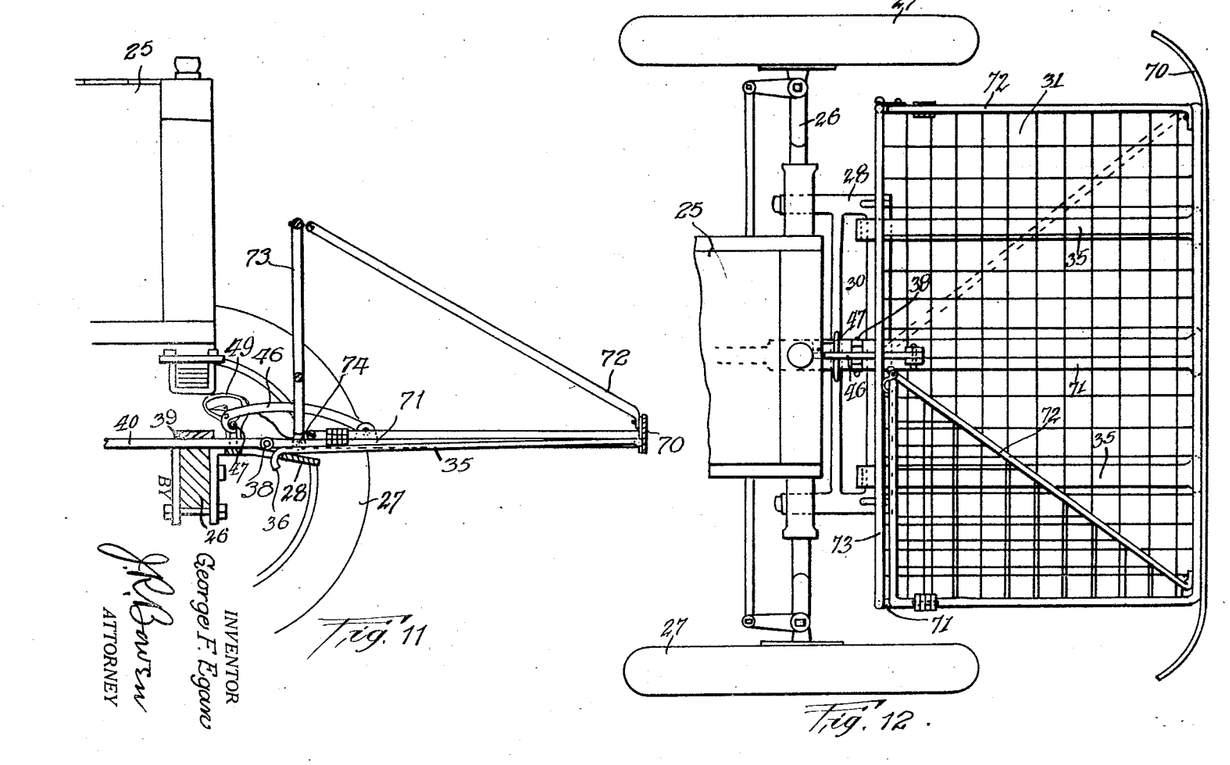
Figure 11 is a longitudinal vertical section, showing the parts in normal extended position.
Figure 12 is a top plan view of the same.

Referring now to the modification disclosed in Figures 10, 11 and 12 the bracket, hook and cam mechanisms are shown as similar to those disclosed in Figures 1 to 7 but the basket in the present form is made collapsible so that it may be raised at the front of the vehicle 25 to gain access to the crank handle or other front portion of the vehicle. In this form the bumper bar 70 is shown as attached to the bottom portion 71 of the basket, and the bumper bar is shown as pivoted thereto. The forward end of side rods 72, when raised, extend rearwardly and upwardly and substantially meet the upper ends of rear standards 73. These standards 73 are pivoted at 74 at their lower ends to the bottom 71 of the basket and are adapted to be folded downwardly upon the same after the side rods 72 have been laid down on the bottom.

As shown in Figure 10, the side rod 72 and the standards or back portion 73 of the basket may be folded down upon the bottom 71 and the latter may be swung upwardly from the knuckle or pivot joint 38 into position in front of the radiator of the vehicle. In this case the hook 46 is sprung out of the cam 49 so that the hook may swing free and backwardly of the cam as shown in Figure 10. If desired, a suitable hook or catch may be provided to hold the basket in upward position.

Figures 13, 14, 15:
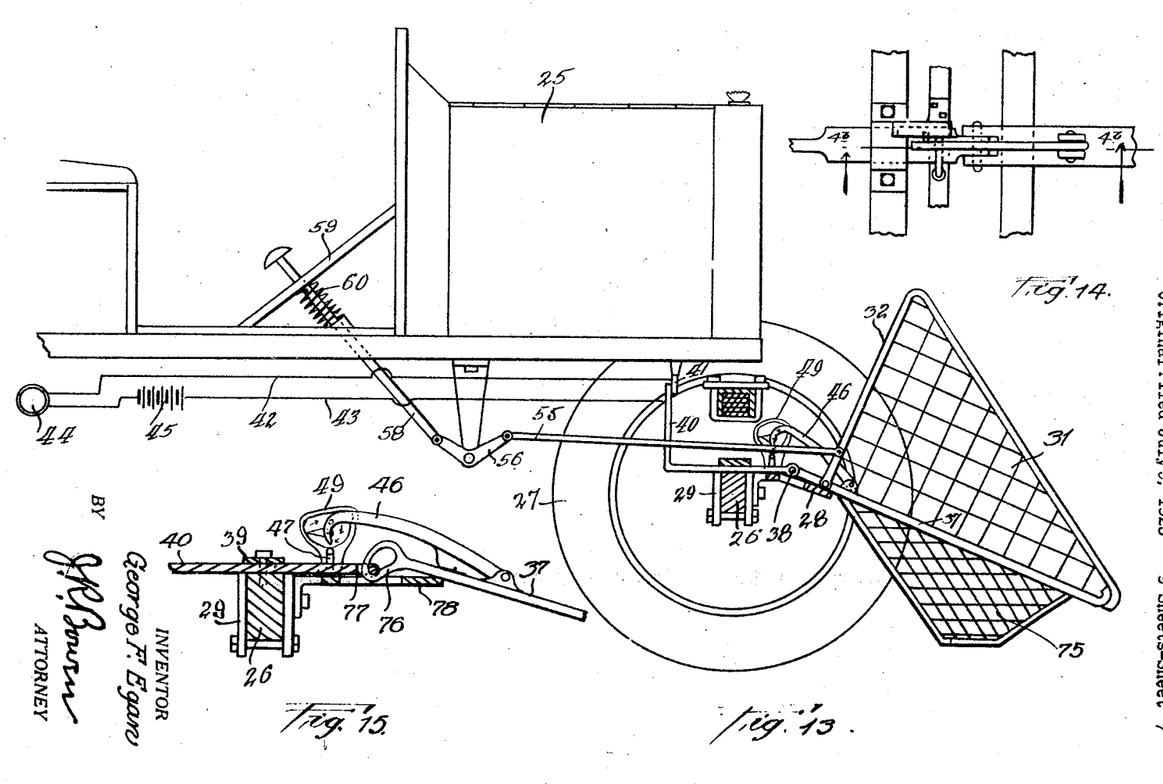
Figure 13 is a longitudinal vertical section, through the forward end of a vehicle and a still further modified form of my fender applied thereto.
Figure 14 is a fragmentary top plan view of the same.
Figure 15 is a fragmentary sectional view taken through a modified form of a fender bracket and fender, showing the parts in tripped position.

Figure 13 shows an embodiment of my invention having a depending basket section 75 arranged upon the bottom of a basket and which projects downwardly into close proximity to the ground for deflecting or catching objects that might be under the forward end of the basket 31 when the latter is in lowered position.

Figures 14 and 15 disclose a slight modification in the bracket and hinged joint connection for the rod sections 37 and 40. In lieu of the hinge or knuckle joint 38, the rear end of the rod 37 is shown as provided with a downwardly offset loop 76 which provides a substantially triangular ring received through an eye 77 formed in the forward end of the section 40. The lower end of the loop 76 is shown as reduced in width as compared with the upper end, and the inner opposite face of the loop or ring 76 is struck on an arc the center of whose radius is located forwardly of the loop 76 and below the plane of the rod 37. Such construction and arrangement of the face of the ring 76 effects the raising and lowering of the rod 37 when it is moved forwardly and rearwardly, and the bracket 78 may be disposed horizontally as shown in Figure 15 and adapted to support the rod 37 across its forward edge. The upper enlarged end of the ring or loop 76 permits of sufficient free play between the parts 40 and 37 to allow the hook 46 to engage and disengage the loop 47.

Figures 16, 17:
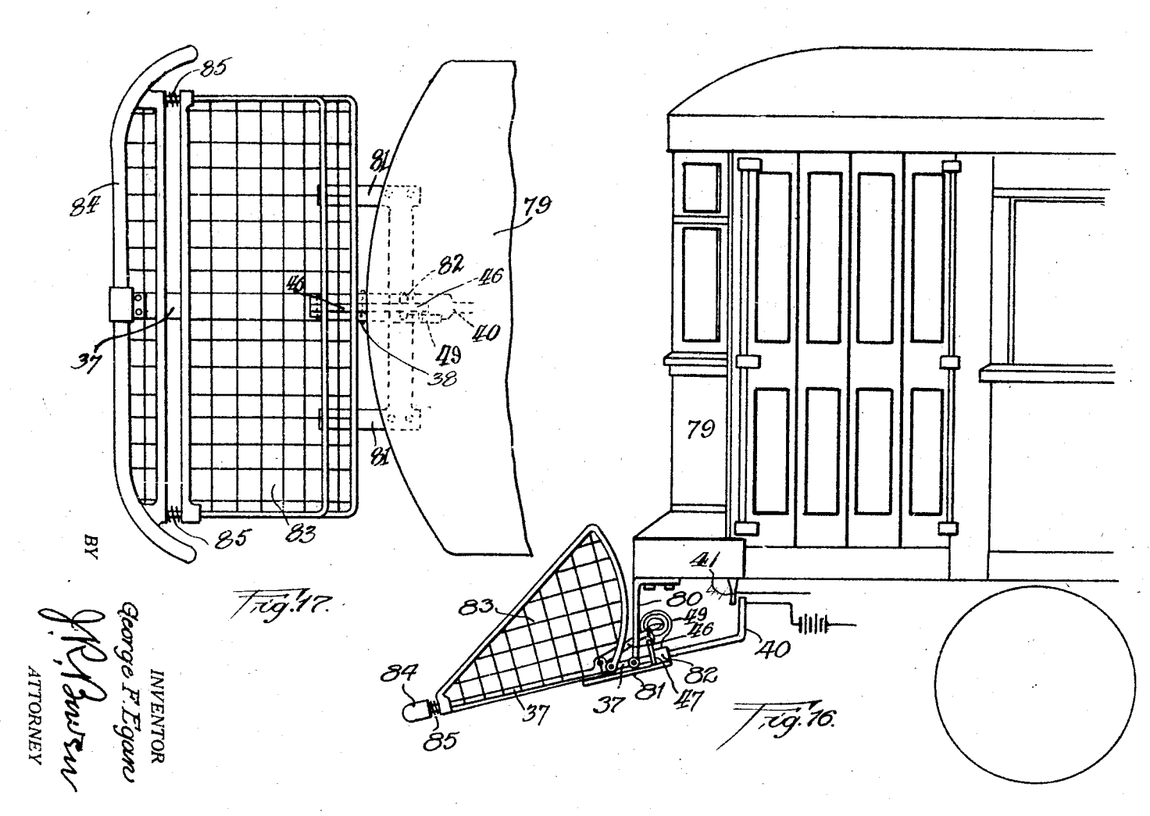
Figure 16 is a side elevation of one end of a street car having a fender of the present invention applied thereto.
Figure 17 is a top plan view of the same.

Figures 16 and 17 disclose further modifications of the device for application to street cars and the like.

The vehicle 79, in the form of a trolley or street car is shown as provided with a depending bracket arm 80 carrying a forwardly and downwardly inclined bracket 81 upon which the guide rod 37 is shown as mounted, the latter passing through a guide 82. The basket 83 is shown as having a forward section 84 mounted upon springs 85 which yieldingly hold the section 84 in advance of the basket 83. The bar 37 is shown as connected to the section 84 and is moved rearwardly thereby and when the basket 82 drops down the arm 40 will come into engagement with the contact pull 41 and the circuit of the signal lamp will be closed. The other parts of the apparatus are constructed similarly to those disclosed in Figures 1 to 7.

Figures 18, 19:
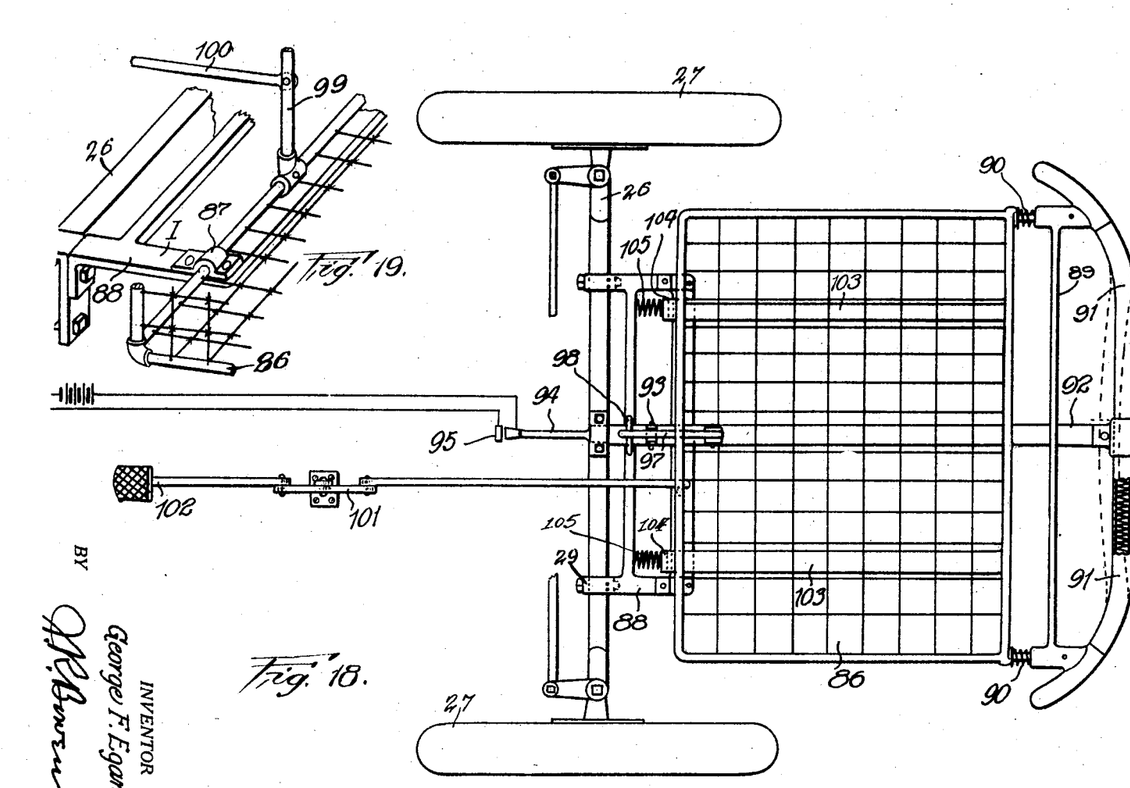
Figure 18 is a top plan view of another modified form of the inention shown as applied to the front axle of a motor vehicle.
Figure 19 is a fragmentary perspective view of the same.
Figure 20:
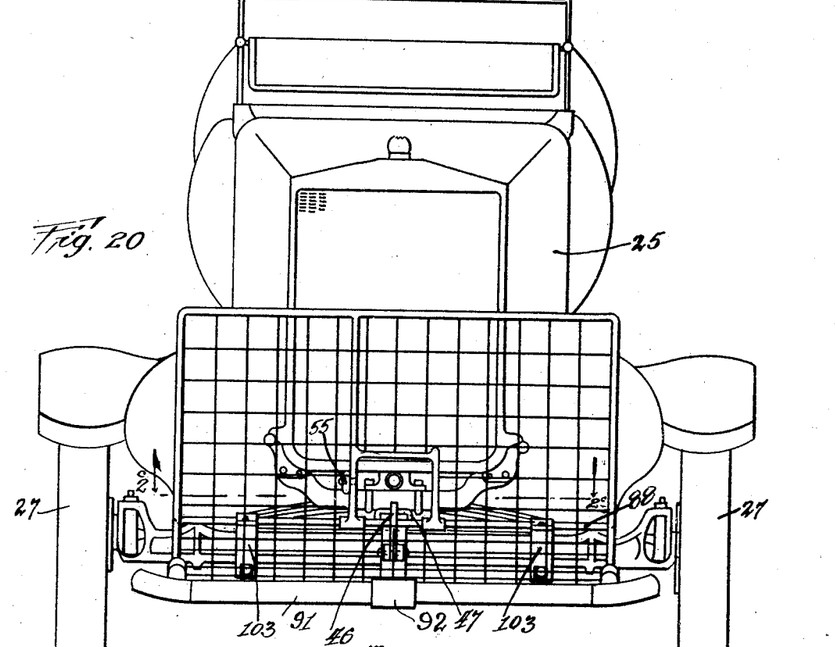
Figure 20 is a front elevation of a modification of the form of the invention shown in Figure 18.

In Figures 18, 19 and 20 is shown a further modification wherein the cam 49 is omitted and wherein the basket 86 is shown as hinged by straps 87 upon the forward end of a horizontal bracket 88 and wherein the basket 86 is shown as provided at its forward lower end with a cross bar 89 mounted upon the springs 90 for yieldingly urging the bar 89 forwardly from the basket 86, the bar 89 having bracket portions at opposite ends between the outer extremities of which is shown as arranged a flexible bumper bar 91. The flexible bumper bar 91 may comprise a spring having a suitable flexible covering as shown in Figure 18 and which at its middle portion is shown as connected to a slide bar 92 which passes rearwardly under the bottom of the basket 86 and is connected by a hinge 93 with a contact arm section 94 adapted to be moved against a contact 95 to close the circuit of a signal lamp 96. When the bumper bar 91 engages an object the bumper bar is deflected inwardly as shown in dotted lines in Figure 18 and the bar 92 is slid inwardly to bring the contacts together and close the circuit which energizes the signal lamp 96. The bar 92 carries a locking dog or hook 97 which has a bill which engages over a loop 98 rising from the bracket 88 and which straddles the horizontal portion of the contact arm 94.

The rear end of the basket is shown as provided with an upright 99 to which is pivoted a rod 100 leading rearwardly to the bell crank lever 101 operable by a pedal 102 adapted to be depressed for raising the basket when it is swung down upon its pivotal straps 87. The basket 86 is shown as provided with the strap bars 103 beneath its opposite side portion and which have hooks 104 against which springs 105 bear, the springs engaging at their other ends against the bracket 88 for yieldingly holding the basket 86 in its upwardly swung position.

I prefer that the basket should be so positioned that a person or object thrown into the basket will not strike the vehicle.

It will, of course, be understood that the fender may be fastened to any suitable part of the vehicle and that the fender may be raised manually, as well as mechanically, if desired.

It is obvious that various changes and modifications may be made in the details of construction and design of the above specifically described embodiment of my invention without departing from the spirit thereof.

What is claimed is:—

1. In a vehicle fender, a basket member, mounting means for pivotally and slidably holding the basket member on a vehicle, a supporting device for holding the basket member in upright position, an interlocking element carried by said mounting means for receiving the hook when the basket member is raised, and a guide member for operation on the hook to release it from the interlocking element when the basket member is slid backwardly and arranged to guide said hook into interlocking engagement with said element upon a subsequent raising of the basket member.

2. In a vehicle fender, a basket member, means for pivotally and slidably mounting the basket member on a vehicle, a hook member, an interlocking element for engagement with said hook member to support the basket member when raised, and a guide member for said hook arranged to release the hook from said interlocking element upon the backward movement of the basket member whereby the latter is permitted to drop, said guide member also adapted to guide said hook into engagement with said interlocking element upon the subsequent raising of the basket member.

3. In a vehicle fender, a basket member, means for pivotally and slidably mounting the basket member on a vehicle, a hook on said member, a loop on said means adapted to receive the hook for supporting the basket member in upright position, and a cam member carried by said means and fixed relatively to the hook and arranged to release the hook from said loop when the basket member is slid backwardly and permit the basket member to drop, said cam member also being adapted to guide said hook into the loop upon the subsequent raising of the basket member.

4. In a vehicle fender, a basket member, means for pivotally and slidably mounting the basket member on a vehicle, a hook on said member, a loop on said basket means adapted to receive the hook for supporting the basket member in upright position, a cam mounted at one side of the hook, and a pin on the hook projecting into engagement with the cam, said cam having an elevating portion adapted to raise the hook from the loop when the basket member is slid backwardly and having a retaining part adapted to support the pin when elevated to permit the basket member to drop.

5. In a vehicle fender, a basket member, means for pivotally and slidably mounting the basket member on a vehicle, a hook on said member, a loop on said means adapted to receive the hook for supporting the basket member in upright position, a cam mounted at one side of the hook, and a pin on the hook projecting into engagement with the cam, said cam having an elevating portion adapted to raise the hook from the loop when the basket member is slid backwardly, said cam having a switch at the top of said elevating portion beneath which said pin is adapted to snap and over which the pin is subsequently directed upon the dropping of the basket member, said loop being spaced forwardly of the switch whereby the pin may ride over said loop and interlock therewith upon the relifting of said basket member.

6. In a vehicle fender, a basket member, means for pivotally and slidably mounting the basket member on a vehicle, a hook on said member, a loop on said means adapted to receive the hook for supporting the basket member in upright position, a cam mounted at one side of the hook, and a pin on the hook projecting into engagement with the cam, said cam having an elevating portion adapted to raise the hook from the loop when the basket member is slid backwardly, said cam having an interior triangular trackway over which said pin is adapted to traverse and having one side inclined to raise the pin and hook from the loop, a switch in the cam for engaging beneath the pin when raised and permitting the dropping of the basket member free of the hook, said switch permitting the subsequent elevation of the pin sufficiently to interlock the hook and loop.

7. In a vehicle fender, a basket member, means for pivotally mounting the basket member on the vehicle, a hook slidably mounted for supporting the basket member, a loop adapted to be mounted on the vehicle for receiving the hook to support the basket member in a substantially horizontal position, a pin projecting from one side of the hook, a cam mounted on the vehicle and having a trackway in one side adapted to receive the pin for raising the hook when slid forwardly, and means associated with the cam for causing the pin to travel in one direction in said trackway whereby to maintain the hook elevated out of contact with the loop subsequent to the backward sliding of the hook for permitting the basket member to drop, said cam member being adapted to raise said hook into interlocking position with the loop when said basket member is subsequently returned into its horizontal position.

In testimony whereof I affix my signature.

GEORGE F. EGAN.